(12) United States Patent
Vassilieva et al.

(10) Patent No.: US 9,197,320 B2
(45) Date of Patent: Nov. 24, 2015

(54) SYSTEM AND METHOD FOR MONITORING POLARIZATION-DEPENDENT LOSS

(71) Applicant: Fujitsu Limited, Kawasaki-shi, Kanagawa (JP)

(72) Inventors: Olga Vassilieva, Plano, TX (US); Inwoong Kim, Allen, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 56 days.

(21) Appl. No.: 14/071,267

(22) Filed: Nov. 4, 2013

(65) Prior Publication Data

US 2015/0125143 A1    May 7, 2015

(51) Int. Cl.
*H04B 10/077* (2013.01)
*H04B 10/2575* (2013.01)

(52) U.S. Cl.
CPC ........ *H04B 10/0775* (2013.01); *H04B 10/2575* (2013.01)

(58) Field of Classification Search
None
See application file for complete search history.

(56) References Cited

U.S. PATENT DOCUMENTS

| 6,411,219 | B1 * | 6/2002 | Slater | 340/870.02 |
| 8,761,600 | B2 | 6/2014 | Kim et al. | 398/30 |
| 2004/0208614 | A1 * | 10/2004 | Price | 398/152 |
| 2004/0213338 | A1 * | 10/2004 | Strawczynski et al. | 375/224 |
| 2005/0276601 | A1 * | 12/2005 | Morawski et al. | 398/42 |
| 2014/0079390 | A1 | 3/2014 | Kim et al. | 398/30 |

OTHER PUBLICATIONS

U.S. Appl. No. 14/067,510; "System and Method for In-Band Amplitude-Modulated Supervisory Signaling for Polarization-Multiplexed Systems", 32 pages, filed Oct. 30, 2013.
U.S. Appl. No. 14/080,502; "System and Method for In-Band Frequency-Modulated Supervisory Signaling for Polarization-Multiplexed Systems"; 35 pages, filed Oct. 30, 2013.
U.S. Appl. No. 14/067,451; "System and Method for Monitoring Power Imbalance Induced by Polarization-Dependent Loss"; 29 pages, filed Oct. 30, 2013.
Farku et al., "Multi-impairment monitoring form adaptive finite-impulse-response filters in a digital coherent receiver", Optics Express 2010, vol. 18, No. 26, pp. 26929-26936, Dec. 20, 2010.
Pinata et al., "Joint PDL and In-band OSNR Monitoring Supported by Data-Aided Channel Estimation", OFC 2012, paper OW4G2.
Shin et at., "A Novel frequency and power monitoring method for WDM network", OFC 1998, WJ7, p. 168-170.
Rossi et al., "Optical performance monitoring in reconfigurable WDM optical networks using subcarrier multiplexing", IEEE J. Lightwave Technol. 18, pp. 1639-1648, 2000.
Kozicki et al., "Monitoring of orthogonal polarization power ratio due to PDL using intensity tones in polarization multiplexed signals", OFC/NFOEC 2011, paper OWC5, Mar. 6-10, 2011.

* cited by examiner

*Primary Examiner* — Darren E Wolf
(74) *Attorney, Agent, or Firm* — Baker Botts L.L.P.

(57) ABSTRACT

Systems and method for monitoring a dual-polarization signal are disclosed. The systems and methods include adding a first supervisory signal to a first polarization component of the dual-polarization signal to get a first combined signal, adding a second supervisory signal to a second polarization component of the dual-polarization signal to get a second combined signal, and in the electrical domain, performing a polarization scanning technique on the first and second combined signals.

28 Claims, 9 Drawing Sheets

SYSTEM AND METHOD FOR MONITORING POLARIZATION-DEPENDENT LOSS

TECHNICAL FIELD

This invention relates generally to the field of optical networks and more specifically to monitoring a dual-polarization signal using an in-band supervisory signal.

BACKGROUND

As the importance and ubiquity of optical communication systems increases, it becomes increasingly important to be able to accurately and efficiently monitor the optical communication system in order to ensure proper operation of the optical communication system. The importance of accurate and efficient monitoring increases as optical traffic signals are implemented comprising components with multiple polarizations (e.g., dual-polarization signals). It is increasingly important to be able to monitor the optical communication system in a cost-effective manner, as well as monitor in-line with other components of the optical communication system.

SUMMARY OF THE DISCLOSURE

In accordance with certain embodiments of the present disclosure, systems and method for monitoring a dual-polarization signal are disclosed. The systems and methods include adding a first supervisory signal to a first polarization component of the dual-polarization signal to get a first combined signal, adding a second supervisory signal to a second polarization component of the dual-polarization signal to get a second combined signal, and in the electrical domain, performing a polarization scanning technique on the first and second combined signals.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
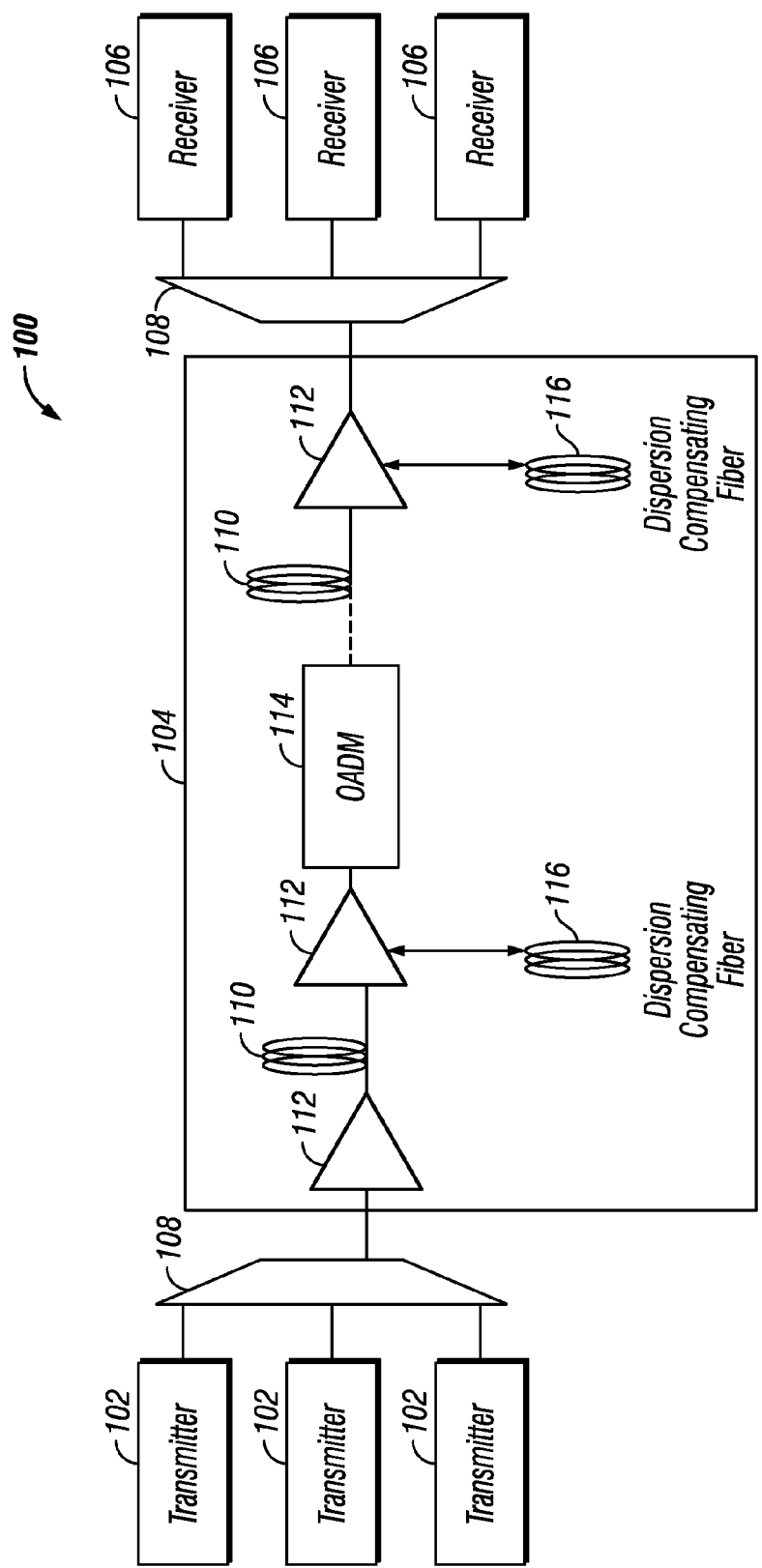
FIG. 1 illustrates an example optical network, in accordance with certain embodiments of the present disclosure.

As used herein, the term "computer-readable media" may be any available media that may be accessed by a general purpose or special purpose computer. By way of example, and not limitation, such computer-readable media may comprise tangible computer-readable including RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. Combinations of the above should also be included within the scope of computer-readable media.

Additionally, "computer-executable instructions" may include, for example, instructions and data which cause a general purpose computer, special purpose computer, or special purpose processing device to perform a certain function or group of functions.

As used herein, the term "module" or "component" may refer to software objects or routines that execute on a computing system. The different components, modules, engines, and services described herein may be implemented as objects or processes that execute on the computing system (e.g., as separate threads), as well as being implemented as hardware, firmware, and/or some combination of all three.

The following describes a cost-effective, in-line solution for monitoring an optical traffic signal of an optical communication system. The present disclosure describes systems and methods for monitoring a relatively low-modulation depth supervisory signal within existing components of the optical communication system in order to monitor wavelength and lightpath information associated with the optical communication system.

Telecommunications systems, cable television systems and data communication networks use optical networks to rapidly convey large amounts of information between remote points. In an optical network, information is conveyed in the form of optical signals through optical fibers or other optical media. The optical networks may include various components such as amplifiers, dispersion compensators, multiplexer/demultiplexer filters, wavelength selective switches, couplers, etc. configured to perform various operations within the optical network. The optical network may communicate supervisory data indicating any number of characteristics associated with the optical network, including source information, destination information and routing information, and other management information of the optical network.

The supervisory data may be used to, among other things, determine an amount of polarization dependent loss ("PDL") associated with a segment of the optical network. In some optical networks, PDL may be a limiting factor in implementation. For example, in 100+ Gb/s optical networks, PDL may be a limiting factor in practical realizations of such optical networks. PDL may cause a power inequality between polarization channels in a polarization-multiplexed optical network. This effect may be more prominent when a polarization axis of a signal and a polarization axis of the PDL are aligned. The resulting lower power may result in a lower optical signal-to-noise ratio ("OSNR") and thus an increased bit error rate ("BER"). In some optical networks, it may be difficult or impossible to compensate for PDL losses with a digital signal processor ("DSP") in a coherent receiver.

PDL may accumulate due to the effects of components present in an optical network such as amplifiers, dispersion compensators, multiplexor/demultiplexer filters, wavelength selective switches, couplers, etc. Additionally, the polarization state of PDL may change due to effects generated by fiber, components, polarization mode dispersion, and/or other effects. PDL may also accumulate randomly. In some models of PDL, the distribution may be approximated by a Maxwell distribution where N>>1.

Monitoring of PDL effects may be difficult in implementations of optical networks due to the relatively high-cost of monitoring elements and may be difficult to implement in-line within the optical network. Moreover, it may be difficult to monitor PDL within each polarization channel.

FIG. 1 illustrates an example optical network 100, in accordance with certain embodiments of the present disclosure. Network 100 may include transmitter 102, transmission system 104, and receiver 106. Network 100 may include one or more optical fibers 110 configured to transport one or more optical signals communicated by components of optical network 100. The network elements of optical network 100, coupled together by fibers 106, may include one or more transmitters 102, one or more multiplexers (MUX) 108, one or more amplifiers 112, one or more optical add/drop multiplexers (OADM) 114, and/or one or more dispersion compensating fibers 116.

The example system of FIG. 1 illustrates a simplified point-to-point optical system. Although one particular form or topography of network 100 is illustrated, network 100 may take any appropriate form, including a ring network, mesh network, and/or any other suitable optical network and/or combination of optical networks.

In some embodiments, transmitter 102 may be any electronic device, component, and/or combination of devices and/or components configured to transmit a multi-polarization optical signal to receiver 106. For example, transmitter 102 may include one or more lasers, processors, memories, digital-to-analog converters, analog-to-digital converters, digital signal processors, beam splitters, beam combiners, multiplexers, and/or any other components, devices, and/or systems required to transmit a dual-polarization optical signal to receiver 106.

In some embodiments, transmitter 102 may be further configured to include a supervisory signal in-band with the optical traffic signal. The systems and methods describing one particular implementation of the supervisory signal with a dual-polarization optical signal are described in more detail in U.S. patent application Ser. Nos. 13/620,102, and 13/620,172, both of which are hereby incorporated by reference. For the purposes of this disclosure, references to an "optical signal" and/or an "optical traffic signal" should be assumed to include the in-band supervisory signal unless expressly stated otherwise.

In some configurations of network 100, it may be costly to implement an in-band supervisory signal with a dual-polarization optical signal. For example, it may be necessary to install high-speed (and thus expensive) photo-detectors, processors, and/or polarimeters. However, in other configurations of network 100, one or more low-data rate supervisory signal(s) may be implemented, allowing for the use of low-speed (and thus lower-cost) photo-detectors, processors, and/or polarimeters. In some embodiments, a low-data rate supervisory signal may have a modulation period much longer than the data period of the optical traffic signal. In the same or alternative embodiments, the low-data rate supervisory signal(s) may allow the supervisory signal(s) to be more easily separated from a main data signal.

In some embodiments, transmitter 102 may communicate an optical traffic signal (along with one or more in-band supervisory signals) to receiver 106 via transmission system 104. Transmission system 104 may generally include the following components: one or more fiber 110, one or more OADM 114 module(s), and/or one or more amplifier(s) 112. With reference to FIG. 1, these components are provided to aid in illustration and are not intended to limit the scope of the present disclosure. In some configurations of network 100, network 100 may include more, fewer, and/or different components than those illustrated in FIG. 1.

In addition, the components of transmission system 104 may be communicatively coupled to one another through the use of fiber 110. In some embodiments, fiber 110 may be any appropriate optical fiber configured to carry data, such as a single-mode optical fiber or a non-zero dispersion shifted fiber. Transmission system 104 may also include amplifier fiber 112. In some embodiments, amplifier 112 may be any amplifier configured to amplify the optical traffic signal (along with the one or more in-band supervisory signal) for more efficient transmission to receiver 106. For example, amplifier 112 may be an erbium doped fiber amplifier ("EDFA") common to optical communication systems. In some embodiments, amplifier 112 may be responsible for certain types of noise introduced to the optical traffic signal. For example, an EDFA introduces a type of noise known to one of ordinary skill in the art as amplified spontaneous emission ("ASE").

In some embodiments, amplifier 112 may be communicatively coupled to dispersion compensating fiber 116. Dispersion compensating fiber 116 may be any appropriate fiber and/or collection of fibers configured to compensate for any nonlinear effects associated with transmission system 104 such as chromatic dispersion.

In some embodiments, network 100 may also include one or more OADM 114. OADM 114 may be any appropriate component and/or collection of components configured to multiplex and/or route multiple wavelengths of light between and/or among nodes of network 100.

In some embodiments, receiver 106 may be any electronic device, component, and/or combination of devices and/or components configured to receive a multi-polarization optical signal from transmitter 102. For example, transmitter 102 may include one or more lasers, optical modulators, processors, memories, digital-to-analog converters, analog-to-digital converters, digital signal processors, beam splitters, beam combiners, demultiplexers, and/or any other components, devices, and/or systems required to receive a dual-polarization optical signal from transmitter 102.

In some embodiments, transmitter 102 and receiver 106 may be present in the same device, for example in an optical communication network including a plurality of optical nodes that are interconnected. In the same or alternative embodiments, transmitter 102 and receiver 106 may be separate devices, located either locally or remote from one another.

In operation, transmitter 102 may communicate a dual-polarization optical traffic signal (along with the one or more in-band supervisory signal(s)) to receiver 106 via transmission system 104. Each polarization tributary of the dual-polarization optical traffic signal may be multiplexed with a supervisory signal. The supervisory signal may be complementary or non-complementary, added in the optical or electrical domain, and may be modulated with any appropriate modulation scheme (e.g., an amplitude or phase modulation technique).

At receiver 106, the supervisory signal(s) may be extracted by tapping a small portion of the signal (e.g., 5%) and detected using relatively lower cost and/or lower speed components, as described in more detail below with reference to FIGS. 2-6. Power imbalance between polarization channels may then be determined based on a power imbalance between or among supervisory signals.

In some embodiments, transmitter 102 may be configured to create supervisory signal data for each polarization tributary of the dual-polarization signal. The modulation depth of the supervisory signal data may be relatively much smaller than the modulation depth of the main traffic signal data. For example, the supervisory signal data may be modulated at a depth that is 5% of the modulation depth of the main traffic signal data. Likewise, the frequency of the supervisory signal data may be relatively substantially less than that of the main traffic signal data. For example, the supervisory signal data may have a frequency in the MHz range while the main traffic data signal has a frequency in the GHz range.

The following configurations are presented as illustrative examples to aid in understanding and are not intended to limit the scope of the present disclosure. In some configurations of network 100, amplitude-modulated supervisory signals and polarization scanning technique may be implemented in the electrical domain, as described in more detail below with reference to FIG. 2. In the same or alternative configurations of system 100, frequency-modulated supervisory signals may be introduced in the optical or electrical domain, while polarization scanning may be done in the optical or electrical domain, as described in more detail below with reference to FIGS. 3-5.

Through the use of polarization scanning, in combination with supervisory signals added to each polarization components of a signal, system 100 may be used to monitor PDL. For example, each supervisory signal tone may experience the same amount of attenuation induced by PDL as the respective polarization components of a signal. A loss of orthogonality may lead to generation of beating components located at frequencies other than supervisory signal frequencies (i.e., outside monitored pilot signals). These may be filtered electrically in the monitoring receiver 104.

At receiver 104, supervisory signals may be extracted by tapping a small portion of the signal (e.g., 5%) and detected using relatively low-speed photo detector(s) and/or electrical filters(s), as described in more detail below with reference to FIG. 2-9. Power fluctuation of supervisory signals, induced by in-line components with PDL, may be measured with a radio frequency power detector ("RFD"). Instantaneous PDL can be determined based on maximum and minimum power measurements of one of the supervisory signals.

Figure 2:
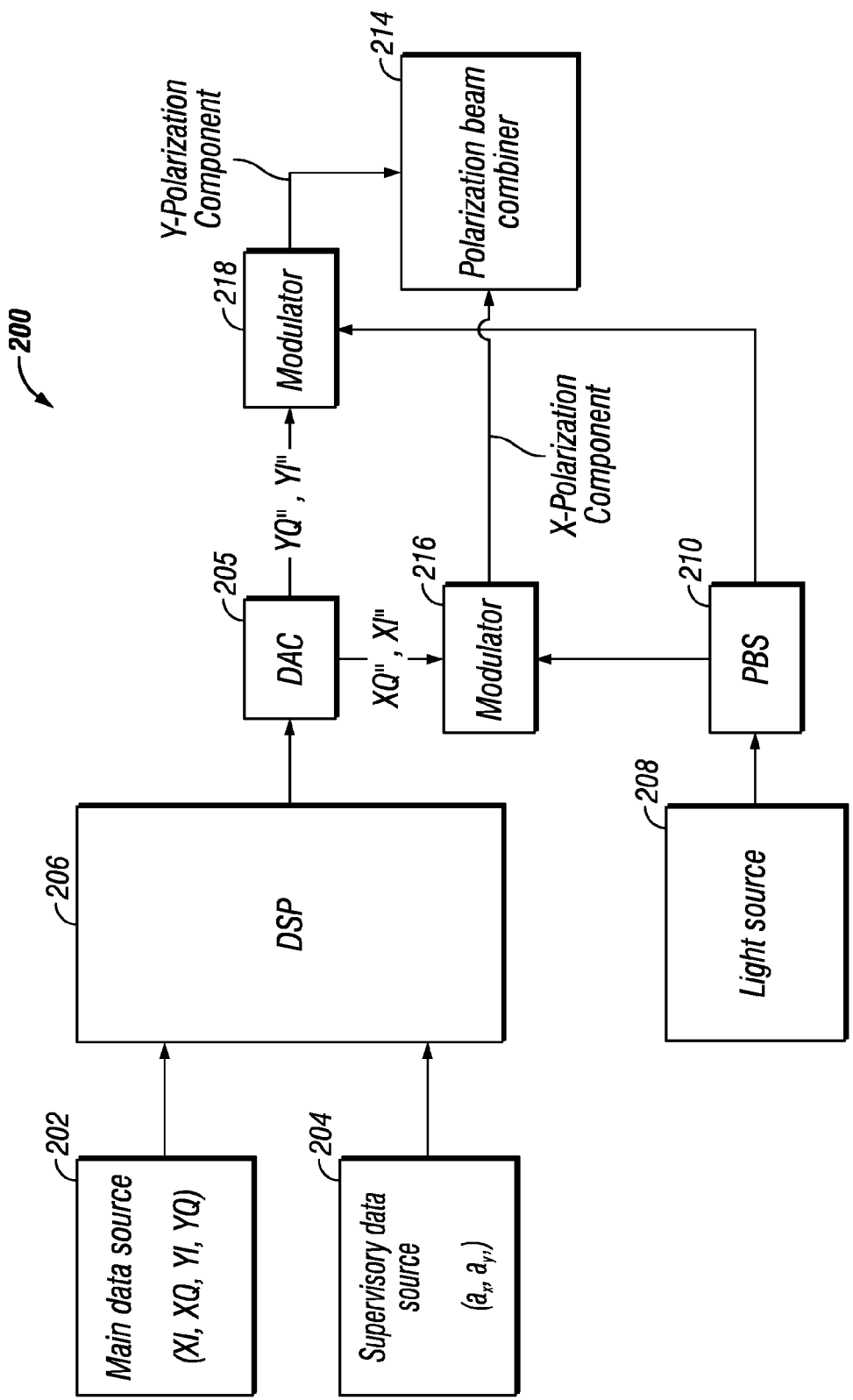
FIG. 2 illustrates an example supervisory signal transmitter for transmitting either complementary or arbitrary, amplitude-modulated supervisory signals, with the introduction of the supervisory signals and the polarization scanning taking place in the electrical domain, in accordance with certain embodiments of the present disclosure.

FIG. 2 illustrates an example supervisory signal transmitter 200 for transmitting either complementary or arbitrary, amplitude-modulated supervisory signals, with the introduction of the supervisory signals and the polarization scanning taking place in the electrical domain, in accordance with certain embodiments of the present disclosure. In some embodiments, transmitter 200 may include main data source 202, supervisory data source 204, digital signal processor ("DSP") 206, digital-to-analog converter ("DAC") 205, light source 208, polarization beam splitter ("PBS") 210, modulators 216, 218, and polarization beam combiner 214.

In some embodiments, supervisory data source 204 may be configured to provide complementary or arbitrary, amplitude-modulated supervisory signals to DSP 206 as described in more detail above with reference to FIG. 1. For the purposes of the present disclosure, a non-complementary signal may be understood to be one in which the value of the x-component of the supervisory signal is not equal to the y-component of the supervisory signal, and in which the x-component of the supervisory signal does not have the opposite value of the y-component of the supervisory signal.

In some embodiments, DSP 206 and light source 208 may be part of a commercially-available transmitter 102. For example, DSP 206 may be a commercially-available digital signal processor integrated into, and/or configured to work alongside other components of transmitter 102. In this way, system 200 may be configured to provide a relatively lower-cost alternative to implementation in a network 100 in which digital signal processors are used with and/or in transmitter 102 by not requiring additional optical components.

In some embodiments, DSP 206 may be configured to combine the main data from main data source 202 with the data from supervisory data source 204 in the electrical domain such that no additional optical components may be required for in-band supervisory signal modulation. In some configurations, the modulation amplitude for the supervisory signal may be slow compared to the rate of the main data as described in more detail above with reference to FIG. 1. In some embodiments, DSP 206 may be further configured to communicate data to one or more DAC 205. DAC 205 may be any component and/or combination of components configured to convert a digital signal from DSP 206 to an analog signal.

In some embodiments, polarization beam splitter 210 may be configured to split the light from light source 208 into a plurality of polarization components. For example, polarization beam splitter 210 may be configured to split the light from light source 208 into x- and y-polarization components. For example, these polarization components may, for ease of reference only, be referred to as XI (e.g., the in-phase portion of the x-polarization component) and XQ (e.g., the quadrature portion of the x-polarization component) for the x-component of the light and YI (e.g., the in-phase portion of the y-polarization component) and YQ (e.g., the quadrature portion of the y-polarization component).

Polarization beam splitter 210 may be communicatively coupled to one or more modulators 216, 218. Modulators 216, 218 may be configured to modulate the incoming signal according to a provided driving signal. In some embodiments, the driving signal may set according to the supervisory signal data. In some embodiments, DSP 206 may use data from main data source 202 and/or supervisory data source 204 in order to determine the appropriate driving signal as described in more detail below.

As an illustrative example, the driving signal for modulator 216 (e.g., the modulator associated with the x-component of the signal) may be denoted as XI" and XQ" and the driving signal for modulator 218 (e.g., the modulator associated with the y-component of the signal) may be denoted as YI" and YQ". The electric field of the driving signals with supervisory data modulation may be expressed as described below with reference to FORMULAS 1-10. With reference to FORMULAS 1-10 below, the x-polarization component supervisory signal may be denoted as having an amplitude of $a_x$ and a frequency of $f_{s,x}$, and the y-polarization component supervisory signal may be denoted as having an amplitude of $a_y$ and a frequency of $f_{s,y}$. With reference to FORMULAS 1-10 below, the supervisory signals may be described in the electrical domain by FORMULAS 1-4 and the polarization scanning many be described in the electrical domain by FORMULAS 5-10:

$$XI' = sqrt[1 + a_x \cos(2\pi f_{s,x} t + \varphi_d)] \cdot XI \quad \text{FORMULA 1}$$

$$XQ' = sqrt[1 + a_x \cos(2\pi f_{s,x} t + \varphi_d)] \cdot XQ \quad \text{FORMULA 2}$$

$$YI' = sqrt[1 + a_y \cos(2\pi f_{s,y} t + \varphi_d)] \cdot YI \quad \text{FORMULA 3}$$

$$YQ' = sqrt[1 + a_y \cos(2\pi f_{s,y} t + \varphi_d)] \cdot YQ \quad \text{FORMULA 4}$$

POLARIZATION ROTATION MATRIX    FORMULA 5

$$R(\theta, \psi) = \begin{pmatrix} \cos\frac{\theta}{2} + i\sin\frac{\theta}{2}(2\psi) & i\sin\frac{\theta}{2}\sin(2\psi) \\ i\sin\frac{\theta}{2}\sin(2\psi) & \cos\frac{\theta}{2} - i\sin\frac{\theta}{2}\cos(2\psi) \end{pmatrix}$$

IQ DATA FOR DUAL-POLARIZATION FORMAT AFTER SUPERVISORY SIGNAL    FORMULA 6
$$E_X^P = XI' + iXQ'$$

IQ DATA FOR DUAL-POLARIZATION FORMAT AFTER SUPERVISORY SIGNAL    FORMULA 7
$$E_Y^P = YI' + iYQ'$$

POLARIZATION ROTATION IN ELECTRICAL DOMAIN    FORMULA 8

$$\begin{pmatrix} E_X'' \\ E_Y'' \end{pmatrix} = R(\theta, \psi) \begin{pmatrix} E_X^P \\ E_Y^P \end{pmatrix}$$

OUTPUT SIGNAL FOR MODULATOR 216    FORMULA 9
$$XI'' = \mathrm{Re}(E_X'), \; XQ'' = \mathrm{Im}(E_X')$$

OUTPUT SIGNAL FOR MODULATOR 218    FORMULA 10
$$YI'' = \mathrm{Re}(E_Y'), \; YQ'' = \mathrm{Im}(E_Y').$$

In some embodiments, polarization beam combiner 214 may be an component configured to combine the signals from modulators 216, 218 into a multiplexed optical signal.

In the above configurations of transmitter 200, no additional optical components may be required for the modulation of the arbitrary, non-complementary, amplitude-modulated supervisory signals.

Figure 3:
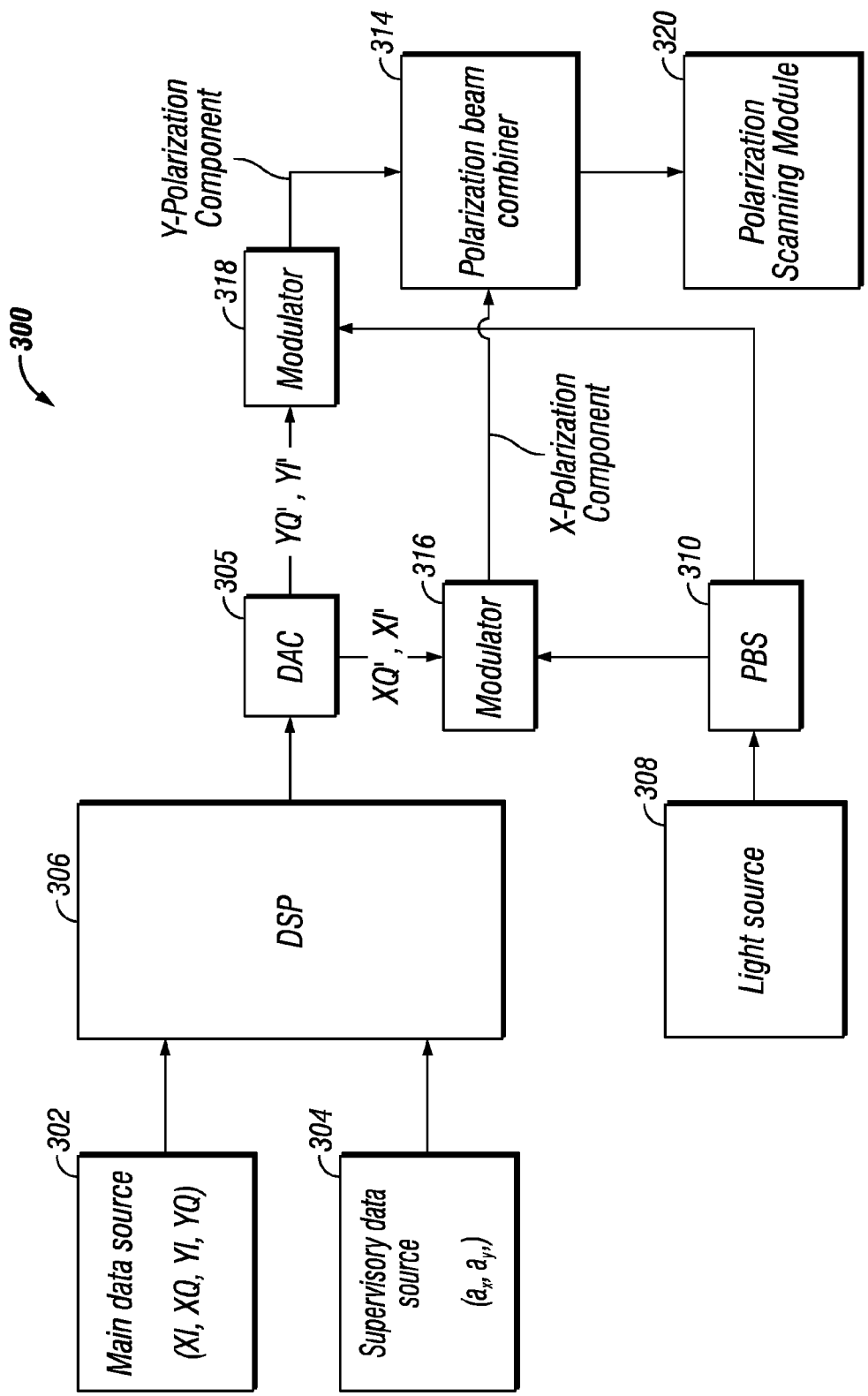
FIG. 3 illustrates an example supervisory signal transmitter for transmitting either complementary or arbitrary, amplitude-modulated supervisory signals, with the introduction of the supervisory signals in the electrical domain and the polarization scanning taking place in the optical domain, in accordance with certain embodiments of the present disclosure.

FIG. 3 illustrates an example supervisory signal transmitter 300 for transmitting either complementary or arbitrary, amplitude-modulated supervisory signals, with the introduction of the supervisory signals in the electrical domain and polarization scanning taking place in the optical domain, in accordance with certain embodiments of the present disclosure. In some embodiments, transmitter 300 may include main data source 302, supervisory data source 304, digital signal processor ("DSP") 306, light source 308, polarization beam splitter 310, modulators 316, 318, polarization beam combiner 314, and polarization scanning module 320.

In some embodiments, supervisory data source 304 may be configured to provide complementary or arbitrary, amplitude-modulated supervisory signals to DSP 306 as described in more detail above with reference to FIG. 1. For the purposes of the present disclosure, a non-complementary signal may be understood to be one in which the value of the x-component of the supervisory signal is not equal to the y-component of the supervisory signal, and in which the x-component of the supervisory signal does not have the opposite value of the y-component of the supervisory signal.

In some embodiments, DSP 306 and light source 308 may be part of a commercially-available transmitter 102. For example, DSP 306 may be a commercially-available digital signal processor integrated into, and/or configured to work alongside other components of transmitter 102. In this way, system 300 may be configured to provide a relatively lower-cost alternative to implementation in a network 100 in which digital signal processors are used with and/or in transmitter 102 by not requiring additional optical components.

In some embodiments, DSP 306 may be configured to combine the main data from main data source 302 with the data from supervisory data source 304 in the electrical domain such that no additional optical components may be required for in-band supervisory signal modulation. In some configurations, the modulation amplitude for the supervisory signal may be slow compared to the rate of the main data as described in more detail above with reference to FIG. 1.

In some embodiments, polarization beam splitter 310 may be configured to split the light from light source 308 into a plurality of polarization components. For example, polarization beam splitter 310 may be configured to split the light from light source 308 into x- and y-polarization components. For example, these polarization components may, for ease of reference only, be referred to as XI (e.g., the in-phase portion of the x-polarization component) and XQ (e.g., the quadrature portion of the x-polarization component) for the x-component of the light and YI (e.g., the in-phase portion of the y-polarization component) and YQ (e.g., the quadrature portion of the y-polarization component).

Polarization beam splitter 310 may be communicatively coupled to one or more modulators 316, 318. Modulators 316, 318 may be configured to modulate the incoming signal according to a provided driving signal. In some embodiments, the driving signal may set according to the supervisory signal data. In some embodiments, DSP 306 may use data from main data source 302 and/or supervisory data source 304 in order to determine the appropriate driving signal as described in more detail below.

As an illustrative example, the driving signal for modulator 316 (e.g., the modulator associated with the x-component of the signal) may be denoted as XI' and XQ' and the driving signal for modulator 318 (e.g., the modulator associated with the y-component of the signal) may be denoted as YI' and YQ'. The electric field of the driving signals with supervisory data modulation may be expressed as described below with reference to FORMULAS 1-4. With reference to FORMULAS 1-4 below, the x-polarization component supervisory signal may be denoted as having an amplitude of $a_x$ and a frequency of $f_{s,x}$, and the y-polarization component supervisory signal may be denoted as having an amplitude of $a_y$ and a frequency of $f_{s,y}$:

$$XI' = \mathrm{sqrt}[1 + a_x \cos(2\pi f_{s,x} t + \phi_d)] \cdot XI \quad \text{FORMULA 1}$$

$$XQ' = \mathrm{sqrt}[1 + a_x \cos(2\pi f_{s,x} t + \phi_d)] \cdot XQ \quad \text{FORMULA 2}$$

$$YI' = \mathrm{sqrt}[1 + a_y \cos(2\pi f_{s,y} t + \phi_d)] \cdot YI \quad \text{FORMULA 3}$$

$$YQ' = \mathrm{sqrt}[1 + a_y \cos(2\pi f_{s,y} t + \phi_d)] \cdot YQ. \quad \text{FORMULA 4}$$

In some embodiments, polarization beam combiner 314 may be an component configured to combine the signals from modulators 316, 318 into a multiplexed optical signal.

In some embodiments, the multiplexed optical signal may be communicated to one or more polarization component(s) 320 Polarization component(s) 320 may be any component and/or combination of components configured to arbitrarily, quasi-randomly, and/or randomly scrambling the average polarization of the multiplexed optical signal. As described in more detail above with reference to FIG. 1, polarization component(s) 320 may be configured to allow determination of PDL-induced losses in system 100.

Figure 4:
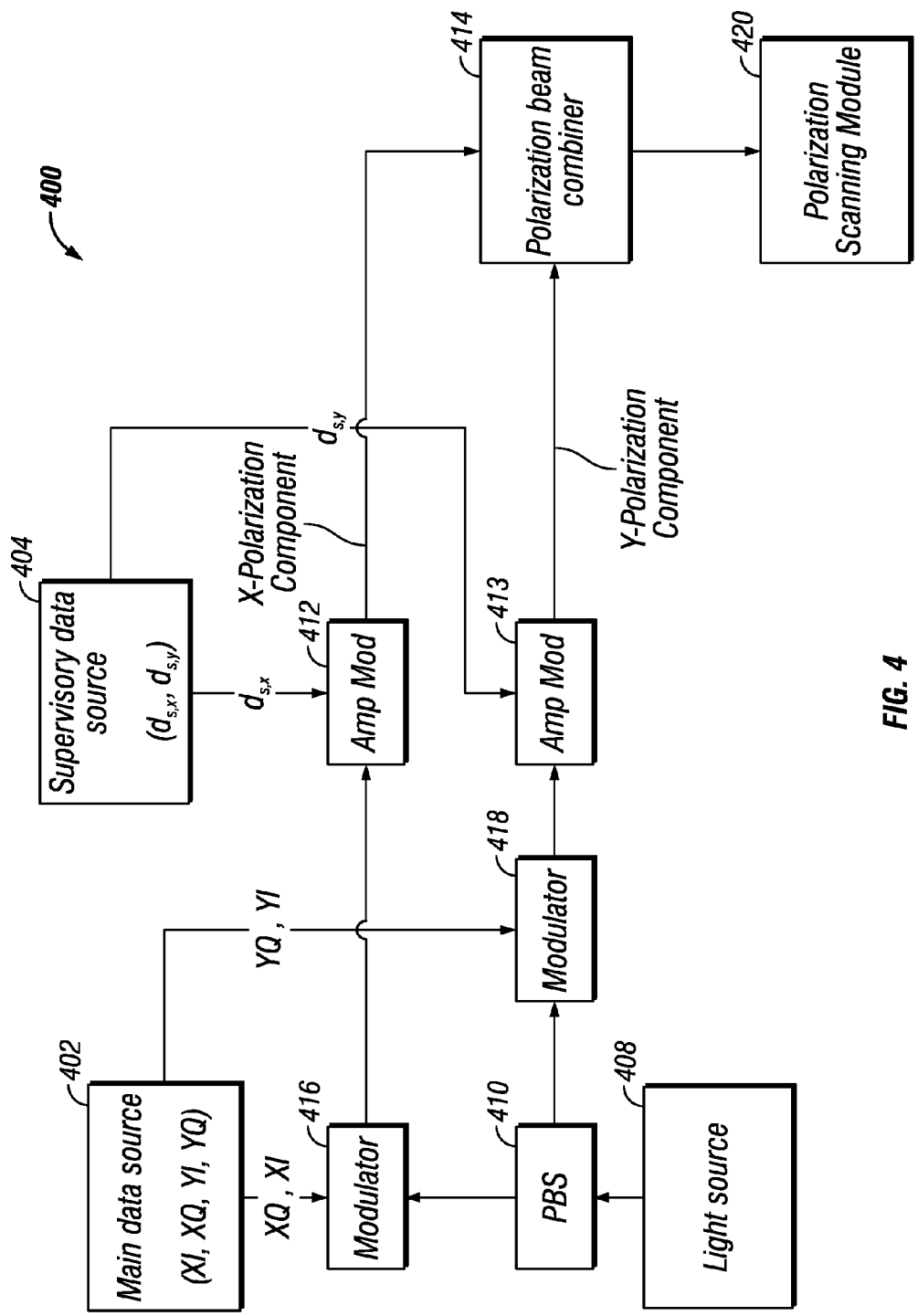
FIG. 4 illustrates a first example supervisory signal transmitter for transmitting either complementary or arbitrary, amplitude-modulated supervisory signals, with the introduction of the supervisory signals in the electrical or optical domain and the polarization scanning taking place in the optical domain, in accordance with certain embodiments of the present disclosure.

FIG. 4 illustrates a first example supervisory signal transmitter 400 for transmitting either complementary or arbitrary, amplitude-modulated supervisory signals, with the introduction of the supervisory signals in the electrical or optical domain and the polarization scanning taking place in the optical domain, in accordance with certain embodiments of the present disclosure. In some embodiments, transmitter 400 may include main data source 402, supervisory data source 404, light source 408, polarization beam splitter 410, modulators 416, 418, amplitude modulators 412, 413, polarization beam combiner 414, and polarization scanning module 420.

In some embodiments, supervisory data source 404 may be configured to provide complementary or arbitrary, amplitude-modulated supervisory signals to DSP as described in more detail above with reference to FIG. 1. For the purposes of the present disclosure, a non-complementary signal may be understood to be one in which the value of the x-component of the supervisory signal is not equal to the y-component of the supervisory signal, and in which the x-component of the supervisory signal does not have the opposite value of the y-component of the supervisory signal.

In some embodiments, polarization beam splitter 410 may be configured to split the light from light source 408 into a plurality of polarization components. For example, polarization beam splitter 410 may be configured to split the light from light source 408 into x- and y-polarization components.

Polarization beam splitter 410 may be communicatively coupled to one or more modulators 416, 418. Modulators 416, 418 may be configured to modulate the incoming signal according to a provided driving signal. In some embodiments, the driving signal may set according to the main signal data, as described in more detail below.

As an illustrative example, the driving signal for modulator 416 (e.g., the modulator associated with the x-component of the signal) may be denoted as XI and XQ and the driving signal for modulator 418 (e.g., the modulator associated with the y-component of the signal) may be denoted as YI and YQ In some embodiments, amplitude modulators 412, 413 may be communicatively coupled to modulators 416, 418, respectively. In some embodiments, amplitude modulators 412, 413 may be any components and/or set of components configured to modulate an incoming signal in an appropriate amplitude modulation scheme. Amplitude modulators 412, 413 may be configured to modulate the incoming signal in association with the supervisory signal data from supervisory data source 404. In some embodiments, the amplitude modulation depth may be substantially less than 1 because the supervisory signal may have high sensitivity due to a low data rate. For ease of reference, the supervisory signal data may be denoted as having an x-polarization component denoted as $d_{s,x}$ and a y-polarization component denoted as $d_{s,y}$. Each modulated signal may then be combined at polarization beam combiner 414 to combine the signals from amplitude modulators 412, 413 into a multiplexed optical signal.

In some embodiments, the multiplexed optical signal may be communicated to one or more polarization component(s) 420. Polarization component(s) 420 may be any component and/or combination of components configured to arbitrarily, quasi-randomly, and/or randomly scrambling the average polarization of the multiplexed optical signal. As described in more detail above with reference to FIG. 1, polarization component(s) 420 may be configured to allow determination of PDL-induced losses in system 100.

Figure 5:
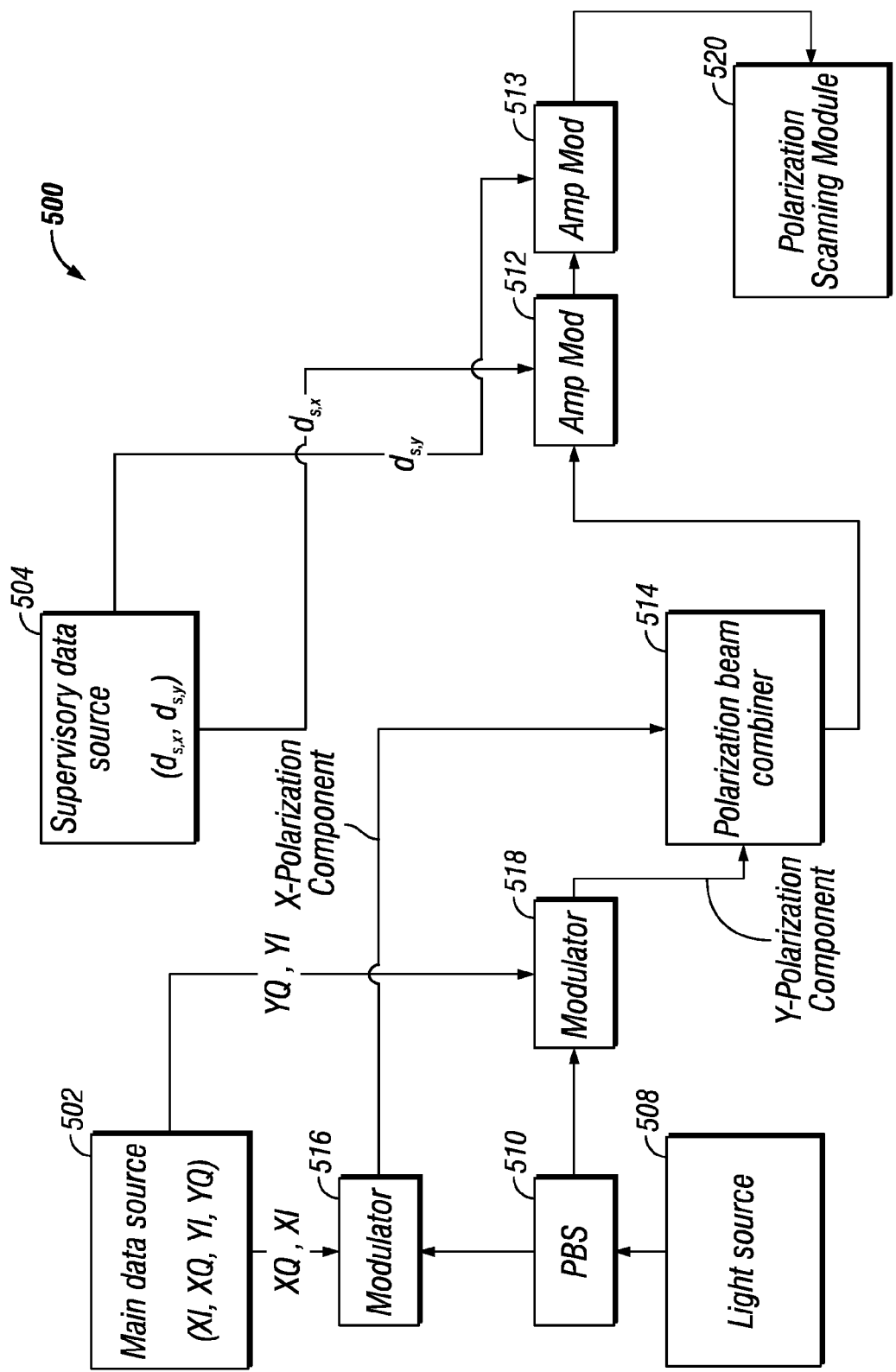
FIG. 5 illustrates a second example supervisory signal transmitter for transmitting either complementary or arbitrary, amplitude-modulated supervisory signals, with the introduction of the supervisory signals in the electrical or optical domain and the polarization scanning taking place in the optical domain, in accordance with certain embodiments of the present disclosure.

FIG. 5 illustrates a second example supervisory signal transmitter 500 for transmitting either complementary or arbitrary, amplitude-modulated supervisory signals, with the introduction of the supervisory signals in the electrical or optical domain and the polarization scanning taking place in the optical domain, in accordance with certain embodiments of the present disclosure. In some embodiments, transmitter 500 may include main data source 502, supervisory data source 504, light source 508, polarization beam splitter 510, modulators 516, 518, amplitude modulators 512, 513, polarization beam combiner 514, and one or more polarization scanning module 520.

In some embodiments, supervisory data source 504 may be configured to provide complementary or arbitrary, amplitude-modulated supervisory signals to DSP as described in more detail above with reference to FIG. 1. For the purposes of the present disclosure, a non-complementary signal may be understood to be one in which the value of the x-component of the supervisory signal is not equal to the y-component of the supervisory signal, and in which the x-component of the supervisory signal does not have the opposite value of the y-component of the supervisory signal.

In some embodiments, polarization beam splitter 510 may be configured to split the light from light source 508 into a plurality of polarization components. For example, polarization beam splitter 510 may be configured to split the light from light source 508 into x- and y-polarization components.

Polarization beam splitter 510 may be communicatively coupled to one or more modulators 516, 518. Modulators 516, 518 may be configured to modulate the incoming signal according to a provided driving signal. In some embodiments, the driving signal may set according to the main signal data, as described in more detail below.

As an illustrative example, the driving signal for modulator 516 (e.g., the modulator associated with the x-component of the signal) may be denoted as XI and XQ and the driving signal for modulator 518 (e.g., the modulator associated with the y-component of the signal) may be denoted as YI and YQ In some embodiments, polarization beam combiner 514 may be an component configured to combine the signals from modulators 516, 518 into a multiplexed optical signal.

In some embodiments, amplitude modulators 512, 513 may be communicatively coupled to polarization beam combiner 514. In some embodiments, amplitude modulators 512, 513 may be any components and/or set of components configured to modulate an incoming signal in an appropriate amplitude modulation scheme. Amplitude modulators 512, 513 may be configured to modulate the incoming signal in association with the supervisory signal data from supervisory data source 504. In some embodiments, the amplitude modulation depth may be substantially less than 1 because the supervisory signal may have high sensitivity due to a low data rate. For ease of reference, the supervisory signal data may be denoted as having an x-polarization component denoted as $d_{s,x}$ and a y-polarization component denoted as $d_{s,y}$. Each modulated signal may then be combined at polarization beam combiner 514 to combine the signals from amplitude modulators 512, 513 into a multiplexed optical signal.

In some embodiments, the multiplexed optical signal may be communicated to one or more polarization scanning component(s) 520 Polarization scanning component(s) 520 may be any component and/or combination of components configured to arbitrarily, quasi-randomly, and/or randomly scrambling the average polarization of the multiplexed optical signal. As described in more detail above with reference to FIG. 1, polarization component(s) 520 may be configured to allow determination of PDL-induced losses in system 100.

Figure 6:
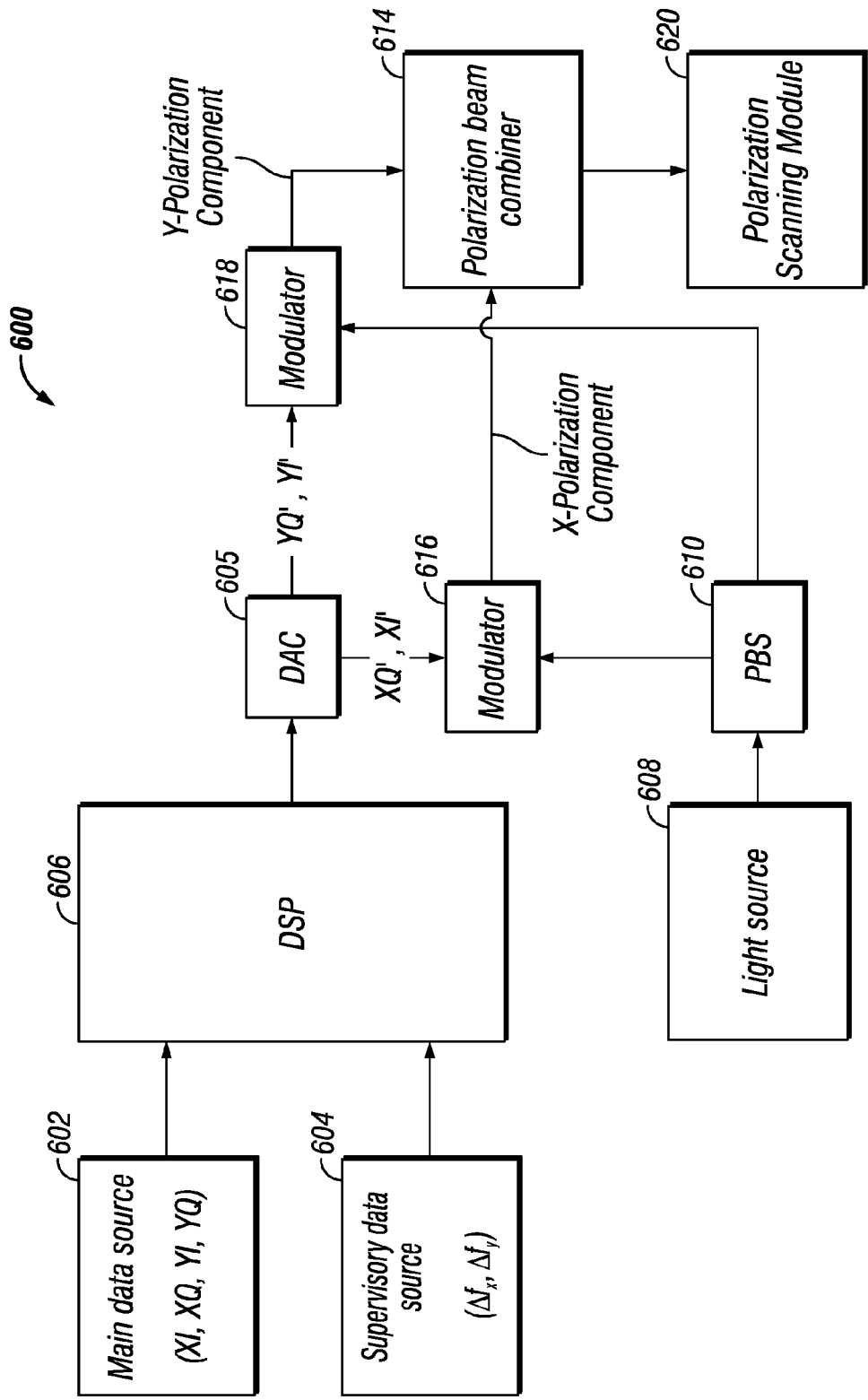
FIG. 6 illustrates an example supervisory signal transmitter for transmitting either complementary or arbitrary, frequency-modulated supervisory signals, with the introduction of the supervisory signals in the electrical domain and the polarization scanning taking place in the optical domain, in accordance with certain embodiments of the present disclosure.

FIG. 6 illustrates an example supervisory signal transmitter 600 for transmitting either complementary or arbitrary, frequency-modulated supervisory signals, with the introduction of the supervisory signals in the electrical domain and the polarization scanning taking place in the optical domain, in accordance with certain embodiments of the present disclosure. In some embodiments, transmitter 600 may include main data source 602, supervisory data source 604, digital signal processor ("DSP") 606, one or more DACs 605, light source 608, polarization beam splitter 610, modulators 616, 618, polarization beam combiner 614, and one or more polarization scanning module(s) 620.

In some embodiments, supervisory data source 604 may be configured to provide complementary or arbitrary, frequency-modulated supervisory signals to DSP 606 as described in more detail above with reference to FIG. 1. For the purposes of the present disclosure, a non-complementary signal may be understood to be one in which the value of the x-component of the supervisory signal is not equal to the y-component of the supervisory signal, and in which the x-component of the supervisory signal does not have the opposite value of the y-component of the supervisory signal.

In some embodiments, DSP 606 and light source 608 may be part of a commercially-available transmitter 102. For example, DSP 606 may be a commercially-available digital signal processor integrated into, and/or configured to work alongside other components of transmitter 102. In this way, transmitter 600 may be configured to provide a relatively lower-cost alternative to implementation in a network 100 in which digital signal processors are used with and/or in transmitter 102 by not requiring additional optical components.

In some embodiments, DSP 606 may be configured to combine the main data from main data source 602 with the data from supervisory data source 604 in the electrical domain. In some configurations, the modulation amplitude for the supervisory signal may be slow compared to the rate of the main data as described in more detail above with reference to FIG. 1. In some embodiments, DSP 606 may be further configured to communicate data to one or more DAC 605. DAC 605 may be any component and/or combination of components configured to convert a digital signal from DSP 606 to an analog signal.

In some embodiments, polarization beam splitter 610 may be configured to split the light from light source 608 into a plurality of polarization components. For example, polarization beam splitter 610 may be configured to split the light from light source 608 into x- and y-polarization components. For example, these polarization components may, for ease of reference only, be referred to as XI (e.g., the in-phase portion of the x-polarization component) and XQ (e.g., the quadrature portion of the x-polarization component) for the x-component of the light and YI (e.g., the in-phase portion of the y-polarization component) and YQ (e.g., the quadrature portion of the y-polarization component).

Polarization beam splitter 604 may be communicatively coupled to one or more modulators 616, 618. Modulators 616, 618 may be configured to modulate the incoming signal according to a provided driving signal. In some embodiments, the driving signal may set according to the supervisory signal data. In some embodiments, DSP 606 may use data from main data source 602 and/or supervisory data source 604 in order to determine the appropriate driving signal as described in more detail below.

As an illustrative example, the driving signal for modulator 616 (e.g., the modulator associated with the x-component of the signal) may be denoted as XI' and XQ' and the driving signal for modulator 618 (e.g., the modulator associated with the y-component of the signal) may be denoted as YI' and YQ'. The electric field of the driving signals with supervisory data modulation may be expressed as described below with reference to FORMULAS 11-12. With reference to FORMULAS 11-12 below, the x-polarization component supervisory signal may be denoted as having a frequency shift value of $\Delta f_X$ and the y-polarization component supervisory signal may be denoted as having a frequency shift value of $\Delta f_Y$. Additionally, the index of a discrete signal may be denoted by n and discrete time by $t_n$:

$$XI'(n) + iXQ'(n) = [XI(n) + iXQ(n)]\exp\left[i2\pi\frac{\Delta f_X}{2}t_n\right] \quad \text{FORMULA 11}$$

$$YI'(n) + iYQ'(n) = [YI(n) + iYQ(n)]\exp\left[i2\pi\frac{\Delta f_Y}{2}t_n\right]. \quad \text{FORMULA 12}$$

In some embodiments, polarization beam combiner 614 may be an component configured to combine the signals from modulators 616, 618 into a multiplexed optical signal.

In some embodiments, the multiplexed optical signal may be communicated to one or more polarization scanning component(s) 620 Polarization scanning component(s) 620 may be any component and/or combination of components configured to arbitrarily, quasi-randomly, and/or randomly scrambling the average polarization of the multiplexed optical signal. As described in more detail above with reference to FIG. 1, polarization scanning component(s) 620 may be configured to allow determination of PDL-induced losses in system 100.

Figure 7:
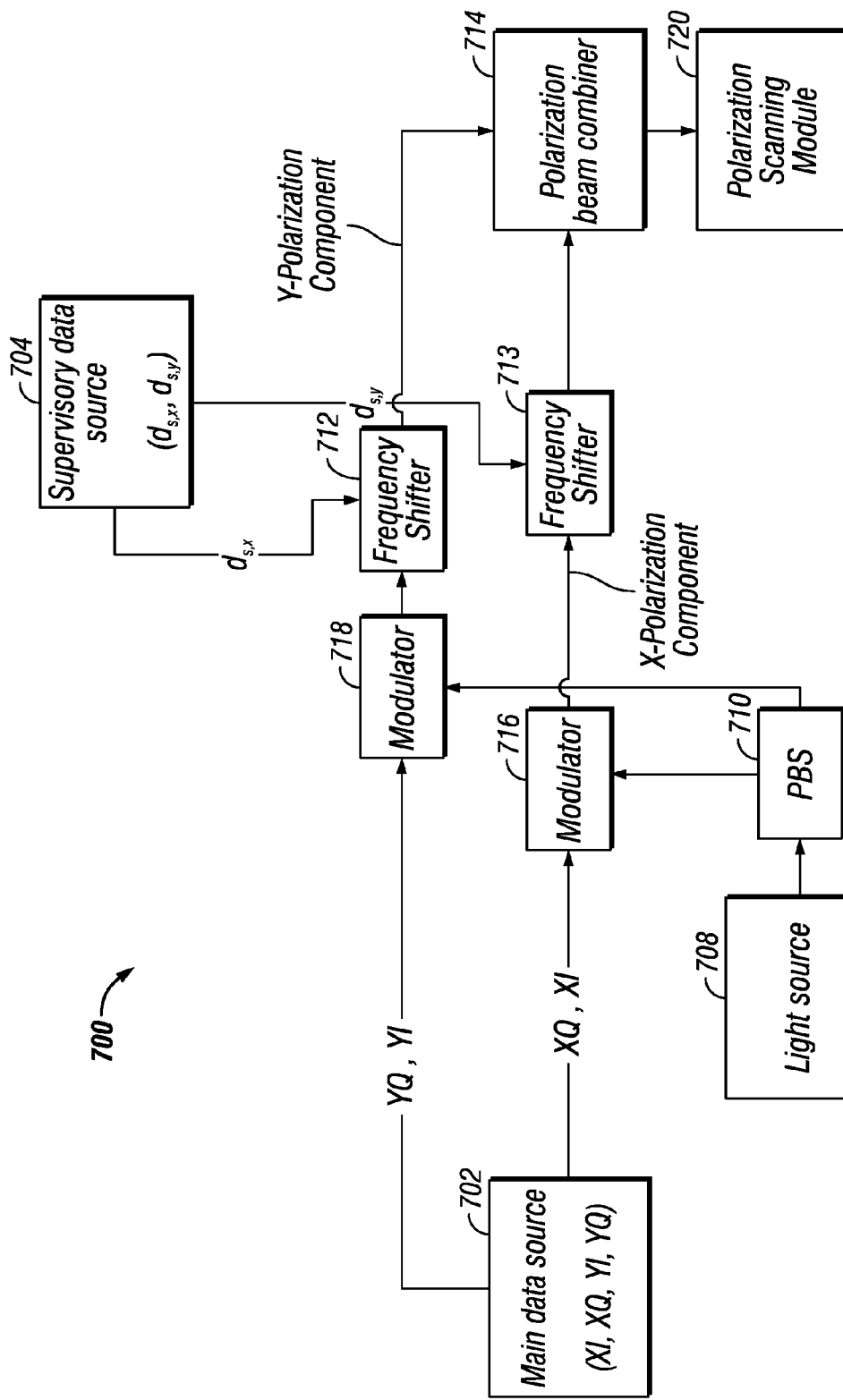
FIG. 7 illustrates an example supervisory signal transmitter 700 for transmitting either complementary or arbitrary, frequency-modulated supervisory signals, with the introduction of the supervisory signals in the optical domain and the polarization scanning taking place in the optical domain, in accordance with certain embodiments of the present disclosure.

FIG. 7 illustrates an example supervisory signal transmitter 700 for transmitting either complementary or arbitrary, frequency-modulated supervisory signals, with the introduction of the supervisory signals in the optical domain and the polarization scanning taking place in the optical domain, in accordance with certain embodiments of the present disclosure. In some embodiments, transmitter 700 may include main data source 702, supervisory data source 704, light source 708, polarization beam splitter 710, modulators 716, 718, frequency shifters 712, 713, polarization beam combiner 714, and one or more polarization scanning module(s) 720.

In some embodiments, supervisory data source 704 may be configured to provide complementary or arbitrary, frequency-modulated supervisory signals to transmitter 700 as described in more detail above with reference to FIG. 1. For the purposes of the present disclosure, a non-complementary signal may be understood to be one in which the value of the x-component of the supervisory signal is not equal to the y-component of the supervisory signal, and in which the x-component of the supervisory signal does not have the opposite value of the y-component of the supervisory signal.

In some embodiments, light source 708 may be part of a commercially-available transmitter 102. In some embodiments, polarization beam splitter 710 may be configured to split the light from light source 708 into a plurality of polarization components.

Polarization beam splitter 710 may be communicatively coupled to one or more modulators 716, 718. Modulators 716, 718 may be configured to modulate the incoming signal according to a provided driving signal. In some embodiments, the driving signal may set according to the supervisory signal data.

As an illustrative example, the driving signal for modulator 716 (e.g., the modulator associated with the x-component of the signal) may be denoted as XI and XQ and the driving signal for modulator 718 (e.g., the modulator associated with the y-component of the signal) may be denoted as YI and YQ. In some embodiments, XI, XQ, YI, and YQ may represent data from main data source 702.

In some embodiments, frequency shifters 712, 713 may be communicatively coupled to modulators 716, 718, respectively. In some embodiments, frequency shifters 712, 713 may be any components and/or set of components configured to modulate an incoming signal in an appropriate frequency modulation scheme. Frequency shifters 712, 713 may be configured to modulate the incoming signal in association with the supervisory signal data from supervisory data source 404. In some embodiments, the frequency modulation frequency may be substantially less than the frequency of the main data signal. In some embodiments, frequency shifters 712, 713 may have the same or different frequency shift values. For ease of reference, the supervisory signal data may be denoted as having an x-polarization component denoted as $d_{s,x}$ and a y-polarization component denoted as $d_{s,y}$. Each modulated signal may then be combined at polarization beam combiner 714 to combine the signals from amplitude modulators 712, 713 into a multiplexed optical signal.

In some embodiments, polarization beam combiner 714 may be an component configured to combine the signals from modulators 716, 718 into a multiplexed optical signal.

In some embodiments, the multiplexed optical signal may be communicated to one or more polarization scanning component(s) 720. Polarization component(s) 720 may be any component and/or combination of components configured to arbitrarily, quasi-randomly, and/or randomly scrambling the average polarization of the multiplexed optical signal. As described in more detail above with reference to FIG. 1, polarization component(s) 720 may be configured to allow determination of PDL-induced losses in system 100.

Figure 8:
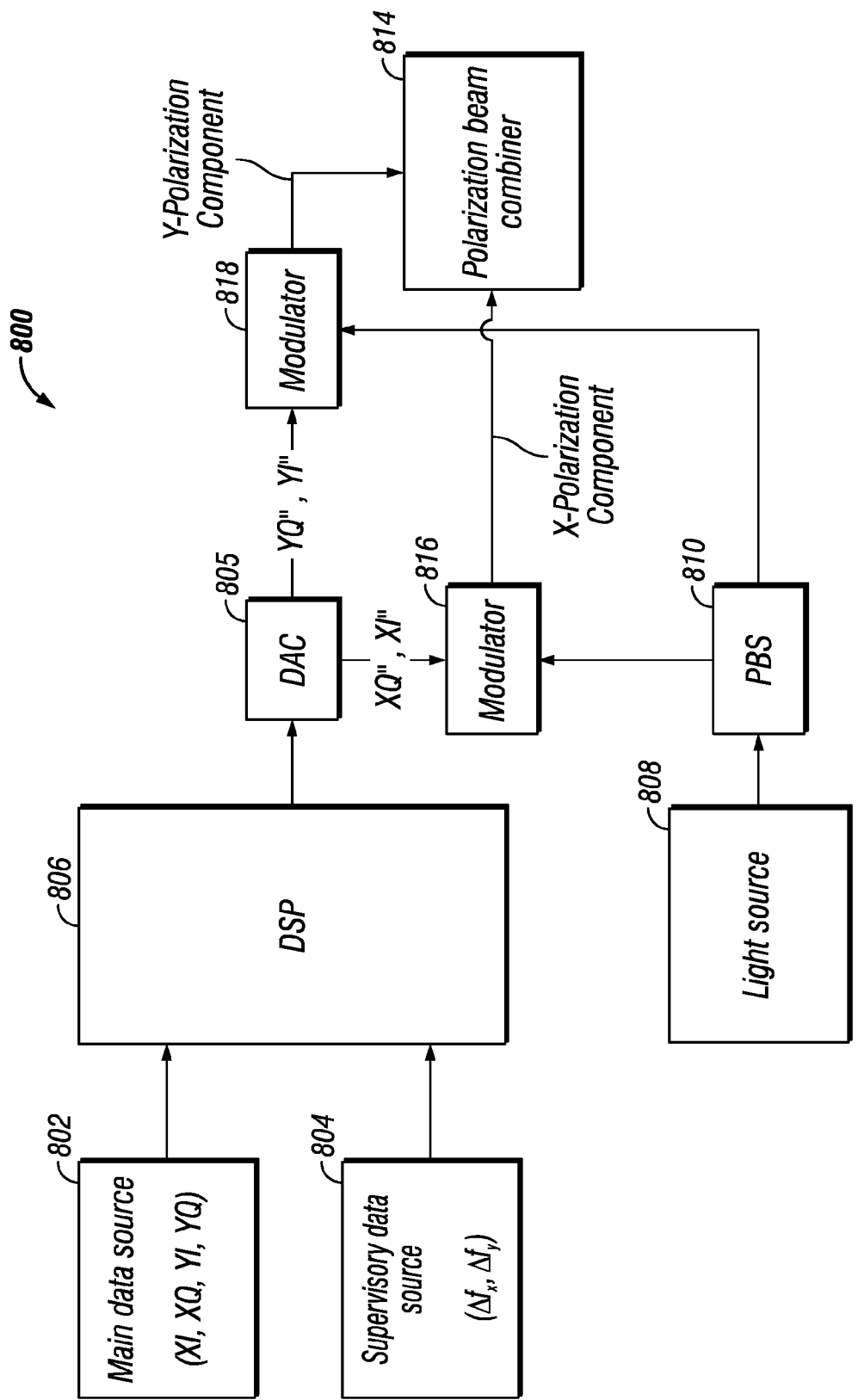
FIG. 8 illustrates an example supervisory signal transmitter for transmitting either complementary or arbitrary, frequency-modulated supervisory signals, with the introduction of the supervisory signals in the electrical domain and the polarization scanning taking place in the electrical domain, in accordance with certain embodiments of the present disclosure.

FIG. 8 illustrates an example supervisory signal transmitter 800 for transmitting either complementary or arbitrary, frequency-modulated supervisory signals, with the introduction of the supervisory signals in the electrical domain and the polarization scanning taking place in the electrical domain, in accordance with certain embodiments of the present disclosure. In some embodiments, transmitter 800 may include main data source 802, supervisory data source 804, digital signal processor ("DSP") 806, light source 808, polarization beam splitter 810, modulators 816, 818, and polarization beam combiner 814.

In some embodiments, supervisory data source 804 may be configured to provide complementary or arbitrary, frequency-modulated supervisory signals to DSP 806 as described in more detail above with reference to FIG. 1. For the purposes of the present disclosure, a non-complementary signal may be understood to be one in which the value of the x-component of the supervisory signal is not equal to the y-component of the supervisory signal, and in which the x-component of the supervisory signal does not have the opposite value of the y-component of the supervisory signal.

In some embodiments, DSP 806 and light source 808 may be part of a commercially-available transmitter 102. For example, DSP 806 may be a commercially-available digital signal processor integrated into, and/or configured to work alongside other components of transmitter 102. In this way, transmitter 800 may be configured to provide a relatively lower-cost alternative to implementation in a network 100 in which digital signal processors are used with and/or in transmitter 102 by not requiring additional optical components.

In some embodiments, DSP 806 may be configured to combine the main data from main data source 802 with the data from supervisory data source 804 in the electrical domain such that no additional optical components may be required for in-band supervisory signal modulation and/or polarization scanning. In some configurations, the modulation frequency for the supervisory signal may be slow compared to the rate of the main data as described in more detail above with reference to FIG. 1. In some embodiments, DSP 806 may be further configured to communicate data to one or more DAC 805. DAC 805 may be any component and/or combination of components configured to convert a digital signal from DSP 806 to an analog signal.

In some embodiments, polarization beam splitter 810 may be configured to split the light from light source 802 into a plurality of polarization components. For example, polarization beam splitter 810 may be configured to split the light from light source 802 into x- and y-polarization components. For example, these polarization components may, for ease of reference only, be referred to as XI (e.g., the in-phase portion of the x-polarization component) and XQ (e.g., the quadrature portion of the x-polarization component) for the x-component of the light and YI (e.g., the in-phase portion of the y-polarization component) and YQ (e.g., the quadrature portion of the y-polarization component).

Polarization beam splitter 810 may be communicatively coupled to one or more modulators 816, 818. Modulators 816, 818 may be configured to modulate the incoming signal according to a provided driving signal. In some embodiments, the driving signal may set according to the supervisory signal data. In some embodiments, DSP 806 may use data from main data source 802 and/or supervisory data source 804 in order to determine the appropriate driving signal as described in more detail below.

As an illustrative example, the driving signal for modulator 816 (e.g., the modulator associated with the x-component of the signal) may be denoted as XI" and XQ" and the driving signal for modulator 818 (e.g., the modulator associated with the y-component of the signal) may be denoted as YI" and YQ". The electric field of the driving signals with supervisory data modulation may be expressed as described below with reference to FORMULAS 11-12 and 5-10. With reference to FORMULAS 11-12 and 5-10 below, the x-polarization component supervisory signal may be denoted as having a frequency shift value of $\Delta f_x$, and the y-polarization component supervisory signal may be denoted as having a frequency shift value of $\Delta f_y$. With reference to FORMULAS 11-12 and 5-10 below, the supervisory signals may be described in the electrical domain by FORMULAS 11-12 and the polarization scanning many be described in the electrical domain by FORMULAS 5-10:

$$XI'(n) + iXQ'(n) = [XI(n) + iXQ(n)]\exp\left[i2\pi\frac{\Delta f_X}{2}t_n\right]$$  FORMULA 11

$$YI'(n) + iYQ'(n) = [YI(n) + iYQ(n)]\exp\left[i2\pi\frac{\Delta f_Y}{2}t_n\right]$$  FORMULA 12

POLARIZATION ROTATION MATRIX  FORMULA 5

$$R(\theta, \psi) = \begin{pmatrix} \cos\frac{\theta}{2} + i\sin\frac{\theta}{2}(2\psi) & i\sin\frac{\theta}{2}\sin(2\psi) \\ i\sin\frac{\theta}{2}\sin(2\psi) & \cos\frac{\theta}{2} - i\sin\frac{\theta}{2}\cos(2\psi) \end{pmatrix}$$

IQ DATA FOR DUAL-POLARIZATION FORMAT AFTER SUPERVISORY SIGNAL  FORMULA 6
$$E_X^P = XI' + iXQ'$$

IQ DATA FOR DUAL-POLARIZATION FORMAT AFTER SUPERVISORY SIGNAL  FORMULA 7
$$E_Y^P = YI' + iYQ'$$

POLARIZATION ROTATION IN ELECTRICAL DOMAIN  FORMULA 8
$$\begin{pmatrix} E_X'' \\ E_Y'' \end{pmatrix} = R(\theta, \psi)\begin{pmatrix} E_X^P \\ E_Y^P \end{pmatrix}$$

OUTPUT SIGNAL FOR MODULATOR 816  FORMULA 9
$$XI'' = \text{Re}(E_X'),\ XQ'' = \text{Im}(E_X')$$

OUTPUT SIGNAL FOR MODULATOR 818  FORMULA 10
$$YI'' = \text{Re}(E_Y'),\ YQ'' = \text{Im}(E_Y').$$

In some embodiments, polarization beam combiner 814 may be an component configured to combine the signals from modulators 816, 818 into a multiplexed optical signal.

In the above configurations of transmitter 800, no additional optical components may be required for the modulation of the arbitrary, non-complementary, frequency-modulated supervisory signals.

Figure 9:
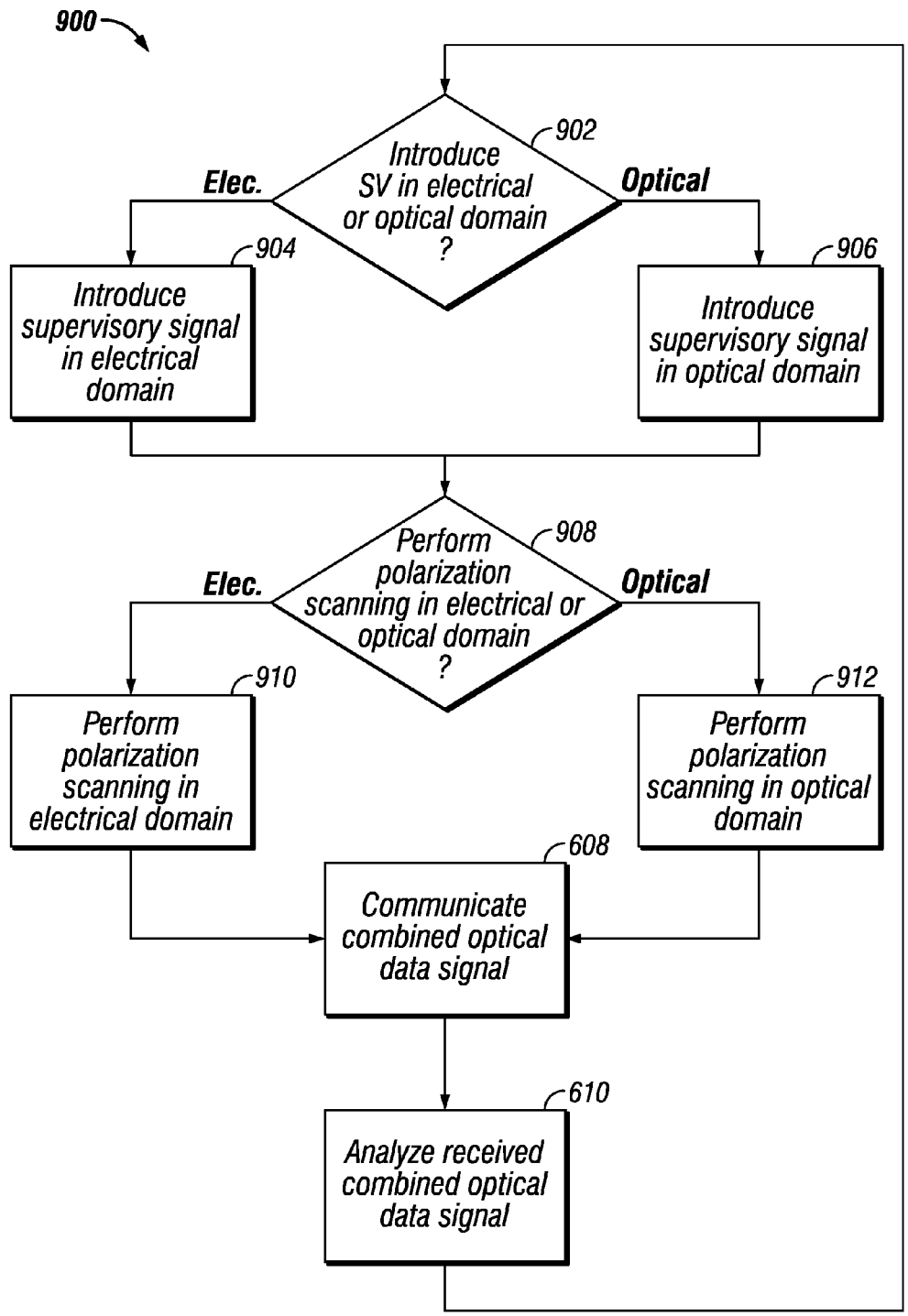
FIG. 9 illustrates a flowchart of an example method for analyzing a supervisory signal associated with an optical traffic signal, in accordance with certain embodiments of the present disclosure.

FIG. 9 illustrates a flowchart of an example method 900 for analyzing a supervisory signal associated with an optical traffic signal, in accordance with certain embodiments of the present disclosure. Method 900 may include introducing an arbitrary, non-complementary supervisory signal and introducing polarization scanning techniques into the combined data signal.

According to one embodiment, method 900 may begin at 902. Teachings of the present disclosure may be implemented in a variety of configurations. As such, the preferred initialization point for method 900 and the order of 902-916 comprising method 800 may depend on the implementation chosen.

At 902, method 900 may determine whether to introduce the supervisory signal data in the electrical domain or the optical domain, as described in more detail above with reference to FIGS. 1-8. If the supervisory signal is to be introduced via the electrical domain, method 900 may proceed to step 904. If the supervisory signal is to be introduced via the optical domain, method 900 may proceed to step 906.

At step 904, method 900 may introduce a supervisory signal to an optical data signal in the electrical domain, as described in more detail above with reference to FIGS. 1-3, 6, and 8. For example, method 900 may introduce a supervisory signal with both an x- and a y-component to a dual-polarization data signal. In some embodiments, this may include using a digital signal processor to combine the supervisory signal data from a supervisory data source with main signal data from a main data source. After introducing the supervisory signal data, method 900 may proceed to step 908.

Referring again to step 906, method 900 may introduce a supervisory signal to an optical data signal in the optical domain, as described in more detail above with reference to FIGS. 1, 4-5, and 7. For example, method 900 may introduce a supervisory signal with both an x- and a y-component to a dual-polarization data signal. In some embodiments, this may include using a plurality of amplitude modulators or frequency shifters to modulate the main signal data with the supervisory signal data. After introducing the supervisory signal data, method 900 may proceed to step 908.

At 908, method 900 may determine whether to introduce the polarization scanning techniques in the electrical domain or the optical domain, as described in more detail above with reference to FIGS. 1-8. If the polarization scanning is to be done in the electrical domain, method 900 may proceed to step 910. If the polarization scanning is to be done in the optical domain, method 900 may proceed to step 912.

At step 910, method 900 may perform polarization scanning in the electrical domain, as described in more detail above with reference to FIGS. 1-2 and 8. After performing the polarization scanning, method 900 may proceed to step 914.

Referring again to step 912, method 900 may perform polarization scanning in the optical domain, as described in more detail above with reference to FIGS. 1 and 3-7. After performing the polarization scanning, method 900 may proceed to step 914.

At step 914, method 900 may communicate the combined optical data signal through the remainder of network 100. For example, transmitter 102 may communicate the combined optical data signal (e.g., the combination of the main data and the supervisory signal) to another component of traffic system 102. After communicating the combined optical data signal, method 900 may proceed to step 916.

At step 916, method 900 may analyze the received combined optical data signal in order to determine PDL information associated with system 100, as described in more detail above with reference to FIG. 1. For example, method 900 may make use of the substantial similarity in attenuation induced by PDL in each supervisory signal. The loss of orthogonality introduced by the polarization scanning may lead to generating of beating components located at frequencies other than supervisory signal frequencies (i.e., outside the monitored supervisory signals). These frequencies may be filtered electrically in the monitoring receiver.

Although FIG. 9 discloses a particular number of steps to be taken with respect to method 900, method 900 may be executed with more or fewer than those depicted in FIG. 9. For example, in some configurations of network 100, the analysis of the supervisory signal data may occur simultaneously with further communication of the combined optical data signal (e.g., when performing in-line analysis). Further, in some configurations of network 100, both electrical domain and/or optical domain combinations of the main data signal data and supervisory signal data may be performed.

What is claimed:

1. A method for monitoring dual-polarization optical signals, the method comprising:
   modulating, at a first frequency, a first supervisory signal onto a first polarization component of an optical signal having dual-polarization components;
   modulating, at a second frequency, a second supervisor signal onto a second polarization component of the optical signal;
   modulating, at a third frequency, the first polarization component and the second polarization component onto the optical signal, wherein the third frequency is an optical transmission frequency that is higher than the first frequency and the second frequency, wherein the first supervisory signal and the second supervisory signal are modulated in-band with the optical signal;
   rotating a polarization angle of the optical signal;
   upon receiving the optical signal after transmission, monitoring the first supervisory signal received and the second supervisory signal received; and
   based on the first supervisory signal received and the second supervisory signal received, determining a polarization-dependent loss (PDL) parameter respectively for each of the first polarization component and the second polarization component.

2. The method of claim 1, wherein the PDL parameter comprises an optical power value, and further comprising:
   based on the respective optical power values for each of the first polarization component and the second polarization component, determining a power imbalance after transmission between the first polarization component and the second polarization component.

3. The method of claim 2, wherein the power imbalance is determined based on the first supervisory signal received and the second supervisory signal received.

4. The method of claim 2, wherein determining the power imbalance further comprises:
   determining a maximum power level and a minimum power level, respectively, for each of the first supervisory signal received and the second supervisory signal received.

5. The method of claim 1, wherein modulating at the first frequency and modulating at the second frequency is performed at least in part in the electrical domain.

6. The method of claim 1, wherein modulating at the first frequency and modulating at the second frequency is performed in the optical domain, and wherein modulating at the third frequency occurs before modulating at the first frequency and modulating at the second frequency.

7. The method of claim 1, wherein the rotating the polarization angle is performed at least in part in the electrical domain.

8. The method of claim 1, wherein the rotating the polarization angle is performed in the optical domain.

9. The method of claim 1, wherein the first supervisory signal and the second supervisory signal are amplitude modulated.

10. The method of claim 1, wherein the first supervisory signal and the second supervisory signal are frequency modulated.

11. The method of claim 1, wherein the first supervisory signal and the second supervisory signal are phase modulated.

12. The method of claim 1, wherein the first supervisory signal and the second supervisory signal are complementary in phase.

13. An optical transport network for transmitting supervisory signals, the optical transport network comprising:
   a transmitter for in-band modulation of an optical signal having a first polarization component and a second polarization component, the transmitter further comprising:
      a digital signal processor to:
         receive first data corresponding to the first polarization component;
         modulate, at a first frequency, a first supervisory signal onto the first data to generate first modulated data;
         receive second data corresponding to the second polarization component; and
         modulate, at a second frequency, a second supervisory signal onto the second data to generate second modulated data;
      a first modulator to modulate, at a third frequency, the first polarization component using an optical source and the first modulated data, wherein the third frequency is an optical transmission frequency of the optical signal that is higher than the first frequency and the second frequency, and wherein the first supervisory signal is modulated in-band with the optical signal;
      a second modulator to modulate, at the third frequency, the second polarization component using the optical source and the second modulated data, wherein the second supervisory signal is modulated in-band with the optical signal;
      a polarization beam combiner to combine outputs from the first modulator and the second modulator into the optical signal; and
      a polarization module to rotate a polarization angle of the optical signal; and
   a monitoring receiver to:
      receive the optical signal after transmission, including the first supervisory signal and the second supervisory signal;
      demodulate the first supervisory signal received and the second supervisory signal received; and
      based on the first supervisory signal received and the second supervisor signal received, determine a polarization-dependent loss (PDL) parameter respectively for each of the first polarization component and the second polarization component.

14. The optical transport network of claim 13, wherein the PDL parameter comprises an optical power value, and wherein the monitoring receiver is further to:
   based on respective optical power values for each of the first polarization component and the second polarization component, determine a power imbalance after transmission between the first polarization component and the second polarization component.

15. The optical transport network of claim 14, wherein the power imbalance is determined based on the first supervisory signal received and the second supervisory signal received.

16. The optical transport network of claim 14, wherein the monitoring receiver to determine the power imbalance further comprises the monitoring receiver to:
   determine a maximum power level and a minimum power level, respectively, for each of the first supervisory signal received and the second supervisory signal received.

17. The optical transport network of claim 13, wherein the first supervisory signal and the second supervisory signal are amplitude modulated.

18. The optical transport network of claim 13, wherein the first supervisory signal and the second supervisory signal are frequency modulated.

19. The optical transport network of claim 13, wherein the first supervisory signal and the second supervisory signal are phase modulated.

20. The optical transport network of claim 13, wherein the first supervisory signal and the second supervisory signal are complementary in phase.

21. An optical transport network for transmitting supervisory signals, the optical transport network comprising:
- a transmitter for in-band modulation of an optical signal having a first polarization component and a second polarization component, the transmitter further comprising:
  - a first modulator to modulate, at a third frequency, the first polarization component using an optical source, wherein the third frequency is an optical transmission frequency of the optical signal;
  - a second modulator to modulate, at the third frequency, the second polarization component using the optical source;
  - a third modulator to modulate, at a first frequency, a first supervisory signal onto the first polarization component, wherein the first supervisory signal is modulated in-band with the optical signal;
  - a fourth modulator to modulate, at a second frequency, a second supervisory signal onto the second polarization component, wherein the third frequency is higher than the first frequency and the second frequency, and wherein the second supervisory signal is modulated in-band with the optical signal;
  - a polarization beam combiner to combine outputs from the third modulator and the fourth modulator into the optical signal; and
  - a polarization module to rotate a polarization angle of the optical signal; and
- a monitoring receiver to:
  - receive the optical signal after transmission, including the first supervisory signal and the second supervisory signal;
  - demodulate the first supervisory signal received and the second supervisory signal received; and
  - based on the first supervisory signal received and the second supervisor signal received, determine a polarization-dependent loss (PDL) parameter respectively for each of the first polarization component and the second polarization component.

22. The optical transport network of claim 21, wherein the PDL parameter comprises an optical power value, and wherein the monitoring receiver is further to:
based on respective optical power values for each of the first polarization component and the second polarization component, determine a power imbalance after transmission between the first polarization component and the second polarization component.

23. The optical transport network of claim 21, wherein the power imbalance is determined based on the first supervisory signal received and the second supervisory signal received.

24. The optical transport network of claim 21, wherein the monitoring receiver to determine the power imbalance further comprises the monitoring receiver to:
determine a maximum power level and a minimum power level, respectively, for each of the first supervisory signal received and the second supervisory signal received.

25. The optical transport network of claim 21, wherein the first supervisory signal and the second supervisory signal are amplitude modulated.

26. The optical transport network of claim 21, wherein the first supervisory signal and the second supervisory signal are frequency modulated.

27. The optical transport network of claim 21, wherein the first supervisory signal and the second supervisory signal are phase modulated.

28. The optical transport network of claim 21, wherein the first supervisory signal and the second supervisory signal are complementary in phase.

* * * * *